(12) United States Patent
Wiltshire

(10) Patent No.: US 11,455,500 B2
(45) Date of Patent: Sep. 27, 2022

(54) AUTOMATIC CLASSIFIER PROFILES FROM TRAINING SET METADATA

(71) Applicant: Insitu, Inc., Bingen, WA (US)

(72) Inventor: Ben Wiltshire, Swindon (GB)

(73) Assignee: INSITU, INC., Bingen, WA (US)

( * ) Notice: Subject to any disclaimer, the term of this patent is extended or adjusted under 35 U.S.C. 154(b) by 113 days.

(21) Appl. No.: 16/720,793

(22) Filed: Dec. 19, 2019

(65) Prior Publication Data
US 2021/0192293 A1 Jun. 24, 2021

(51) Int. Cl.
| | |
|---|---|
| *G06K 9/00* | (2022.01) |
| *G06K 9/62* | (2022.01) |
| *G06F 16/55* | (2019.01) |
| *G06N 3/08* | (2006.01) |
| *G06F 16/587* | (2019.01) |
| *G06V 20/00* | (2022.01) |

(52) U.S. Cl.
CPC ........... *G06K 9/6267* (2013.01); *G06F 16/55* (2019.01); *G06F 16/587* (2019.01); *G06N 3/08* (2013.01); *G06V 20/00* (2022.01)

(58) Field of Classification Search
CPC ...... G06N 3/0454; G06N 20/00; G06N 3/084; G06N 20/10; G06N 7/005; G06N 20/20; G06N 5/04; G06N 5/045; G06N 3/04; G06N 3/08; G06N 5/003; G06N 3/0445; G06N 5/022; G06N 5/025; G06N 5/046; G06N 3/088; G06N 5/041; G06N 3/006; G06N 3/02; G06N 3/0472; G06N 3/0481; G06N 3/082; G06N 5/047; G06N 7/023; G16H 50/20; G16H 10/60; G16H 40/20
See application file for complete search history.

(56) References Cited

U.S. PATENT DOCUMENTS

| | | | |
|---|---|---|---|
| 7,644,053 B2 | 1/2010 | Kipersztok et al. | |
| 7,848,262 B2 | 12/2010 | El-Damhougy | |
| 8,159,976 B2 | 4/2012 | El-Damhougy | |
| 8,471,730 B2 | 6/2013 | Tilloston | |
| 8,620,852 B1 | 12/2013 | Kipersztok et al. | |
| 2007/0018953 A1 | 1/2007 | Kipersztok | |
| 2007/0255755 A1* | 11/2007 | Zhang | G06F 16/78 |
| 2008/0168070 A1* | 7/2008 | Naphade | G06F 16/353 |

(Continued)

OTHER PUBLICATIONS

Data Science, "The model performance vary between different train-test split?"; Retrieved from the internet: URL: https://datascience.stackexchange.com/questions/16119/the-model-performance-vary-between-different-train-test-split [retrieved on Jul. 24, 2019]; pp. 1-3.

*Primary Examiner* — Alex Kok S Liew
(74) *Attorney, Agent, or Firm* — Coats & Bennett, PLLC

(57) ABSTRACT

A method of identifying one or more objects in an image file that includes receiving an image file at a first classifier, wherein the image file comprises image metadata that identifies characteristics of the image file. The method includes determining whether the first classifier is trained to identify at least one object in the image file based on a first set of training metadata associated with the first classifier, wherein the first set of training metadata defines a set of characteristics for which the first classifier is trained to identify the at least one object. The method includes identifying the one or more objects in the image file using the first classifier responsive to determining that the first classifier is trained to identify the at least one object.

20 Claims, 7 Drawing Sheets

(56) References Cited

U.S. PATENT DOCUMENTS

| | | |
|---|---|---|
| 2010/0268673 A1 | 10/2010 | Quadracci |
| 2011/0087666 A1* | 4/2011 | Chou ...................... G06F 16/58 |
| | | 707/E17.014 |
| 2014/0114442 A1 | 4/2014 | Li et al. |
| 2017/0350974 A1 | 12/2017 | Korchev et al. |
| 2019/0079846 A1* | 3/2019 | Shaik ................. G06F 11/3452 |

* cited by examiner

AUTOMATIC CLASSIFIER PROFILES FROM TRAINING SET METADATA

TECHNOLOGICAL FIELD

The present disclosure relates generally to the field of machine learning model assurance. More specifically the present disclosure relates to a determining whether to process input data by a classifier, where the classifier is built using variations of training data.

BACKGROUND

Deep learning frameworks are based on artificial neural networks, where learning can be supervised, semi-supervised, or unsupervised. Deep learning has been applied to fields including computer vision, speech recognition, natural language processing, audio recognition, social network filtering, machine translation, and so on. This type of machine learning can use multiple layers to progressively extract higher level features from raw input. For example, when processing images, lower layers can identify edges while higher layers can identify concepts relevant to users.

Several existing deep learning frameworks produce a classifier. Some deep learning architectures display problematic behaviors, such as classifying unrecognizable images with high confidence as belonging to a familiar category of ordinary images. A user must track the training set used to create the classifier and understand the data where it can be applied. As this is not embedded within the classifier, it is easy to lose track and apply the classifiers to data that is outside the profile.

Existing approaches require a user to independently understand the limitation of the training set and the effect on the classifier performance. This approach requires significant labor intensive efforts.

SUMMARY

According to one aspect of the present application, a method is disclosed for identifying one or more objects in an image file. The method includes receiving an image file at a first classifier, wherein the image file comprises image metadata that identifies characteristics of the image file. The method further includes determining whether the first classifier is trained to identify at least one object in the image file based on a first set of training metadata associated with the first classifier, wherein the first set of training metadata defines a set of characteristics for which the first classifier is trained to identify the at least one object.

According to further aspects, disclosed methods further include comparing the image metadata with a lookup table to select the first classifier.

According to further aspects, the determining whether the first classifier is trained to identify the at least one object in the image file further includes comparing the image metadata to a first set of training metadata.

According to further aspects, the first set of training metadata is different than the second set of training metadata.

According to further aspects, the one or more parameter values in the first set of training metadata are in a second set of training metadata associated with a second classifier.

According to further aspects, disclosed methods further include clustering the first classifier and the second classifier into a group of classifiers, wherein the first classifier and the second classifier are trained to identify objects belonging to an object category.

According to further aspects, disclosed methods further include training the first classifier. Training the classifier includes extracting the training metadata from a set of training image files, wherein the training metadata comprises training metadata values. Training the classifier also includes generating a profile for the first classifier, including the training metadata. Training the classifier additionally includes appending the profile to the first classifier.

According to further aspects, generating the profile includes assigning each training metadata value to a corresponding metadata category. Generating the profile also includes counting a number of training metadata values in each metadata category. Generating the profile additionally includes creating a field for the metadata category in the profile and populating the field with the training metadata values in the metadata category for each metadata category having a training metadata value count that reaches a threshold.

According to further aspects, at least one field is populated with a plurality of values.

According to further aspects, the first set of training metadata are associated with at least one of an aspect ratio, a sensor type, a zoom level, a viewing angle, and a geographical location.

In another aspect, the present application discloses a system for identifying one or more objects in an image file. The system includes a memory and processing circuitry coupled with the memory. The processing circuitry is operable to receive an image file at a first classifier, wherein the image file comprises image metadata that identifies characteristics of the image file. The processing circuitry is also operable to determine whether the first classifier is trained to identify at least one object in the image file based on a first set of training metadata associated with the first classifier, wherein the first set of training metadata defines a set of characteristics for which the first classifier is trained to identify the at least one object. The processing circuitry is additionally operable to identify the one or more objects in the image file using the first classifier responsive to determining that the first classifier is trained to identify the at least one object.

According to further aspects, the processing circuitry is further operable to compare the image metadata with a lookup table to select the first classifier.

According to further aspects, the determining whether the first classifier is trained to identify the at least one object in the image file further includes comparing the image metadata to a first set of training metadata.

According to further aspects, the first set of training metadata is different than the second set of training metadata.

According to further aspects, one or more parameter values in the first set of training metadata are in a second set of training metadata associated with a second classifier.

According to further aspects, the processing circuitry is further operable to cluster the first classifier and the second classifier into a group of classifiers, wherein the first classifier and the second classifier are trained to identify objects belonging to an object category.

According to further aspects, the processing circuitry is further operable to train the first classifier, wherein training the first classifier includes extracting the training metadata from a set of training image files, wherein the training metadata comprises training metadata values; generating a profile for the first classifier, including the training metadata; and appending the profile to the first classifier.

According to further aspects, generating the profile includes assigning each training metadata value to a corresponding metadata category; counting a number of training metadata values in each metadata category; and for each metadata category having a training metadata value count that reaches a threshold: creating a field for the metadata category in the profile; and populating the field with the training metadata values in the metadata category.

According to further aspects, at least one field is populated with a plurality of values.

In another aspect, the present application discloses a computer-readable storage medium, which is non-transitory and having computer-readable program code portions stored therein that in response to execution by processing circuitry, cause an apparatus to receive an image file at a first classifier, wherein the image file comprises image metadata that identifies characteristics of the image file; determine whether the first classifier is trained to identify at least one object in the image file based on a first set of training metadata associated with the first classifier, wherein the first set of training metadata defines a set of characteristics for which the first classifier is trained to identify the at least one object; and identify the one or more objects in the image file using the first classifier responsive to determining that the first classifier is trained to identify the at least one object.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
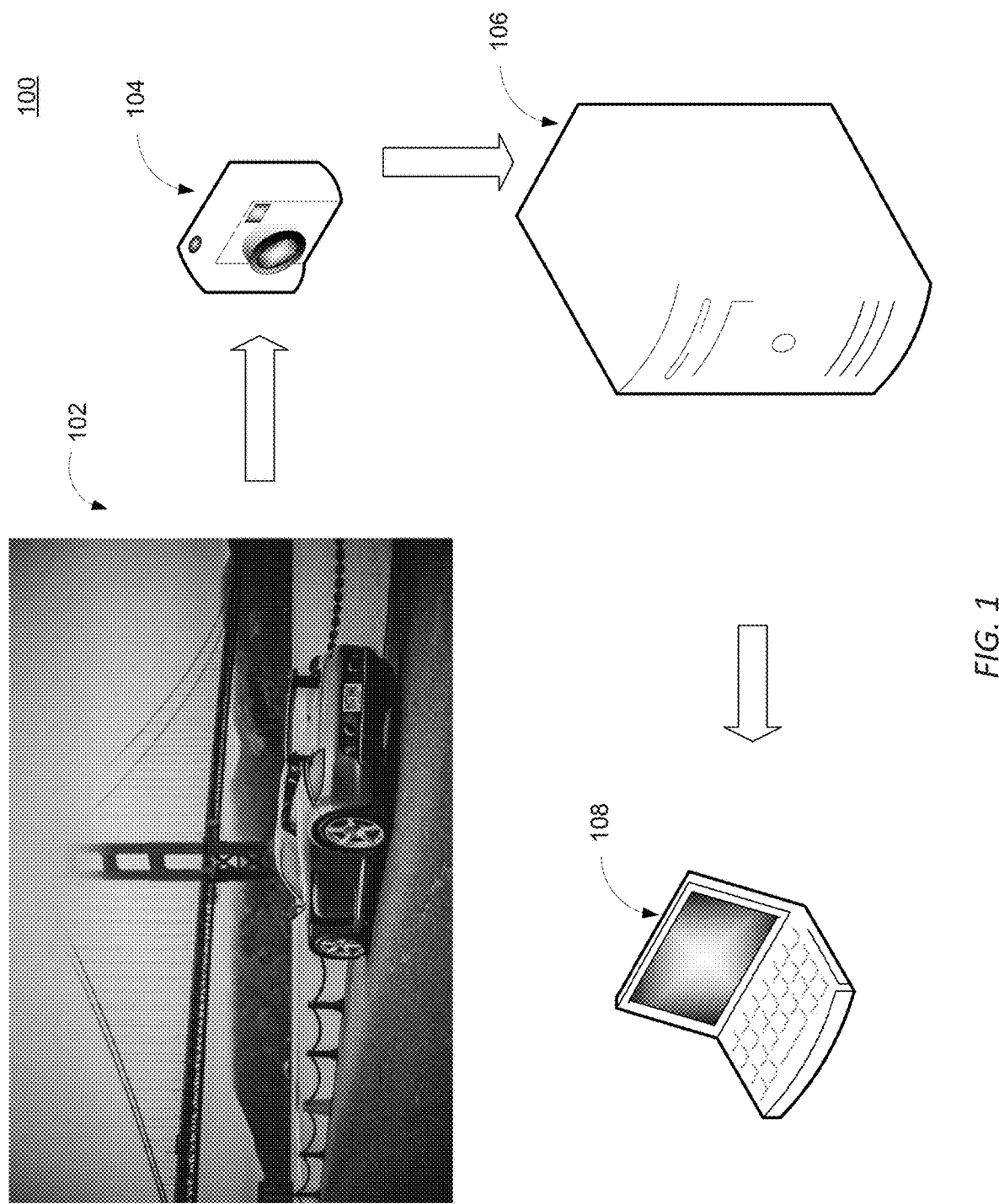

Having thus described variations of the disclosure in general terms, reference will now be made to the accompanying drawings, which are not necessarily drawn to scale, and wherein:

FIG. 1 is an illustration of a system for using a classifier to identify an object in an image.

Figure 2:
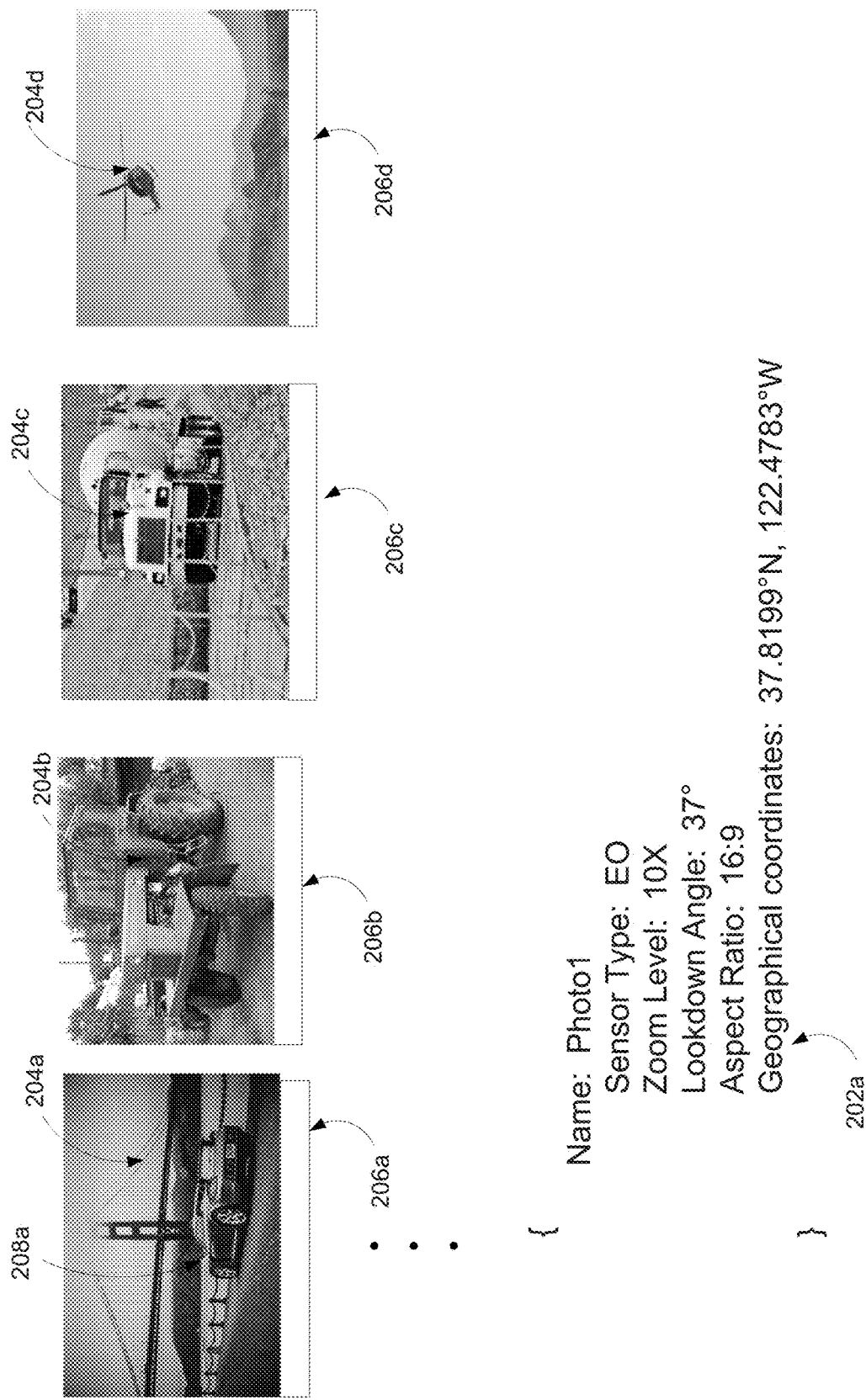

FIG. 2 is an illustration of a set of images with corresponding metadata.

Figure 3:
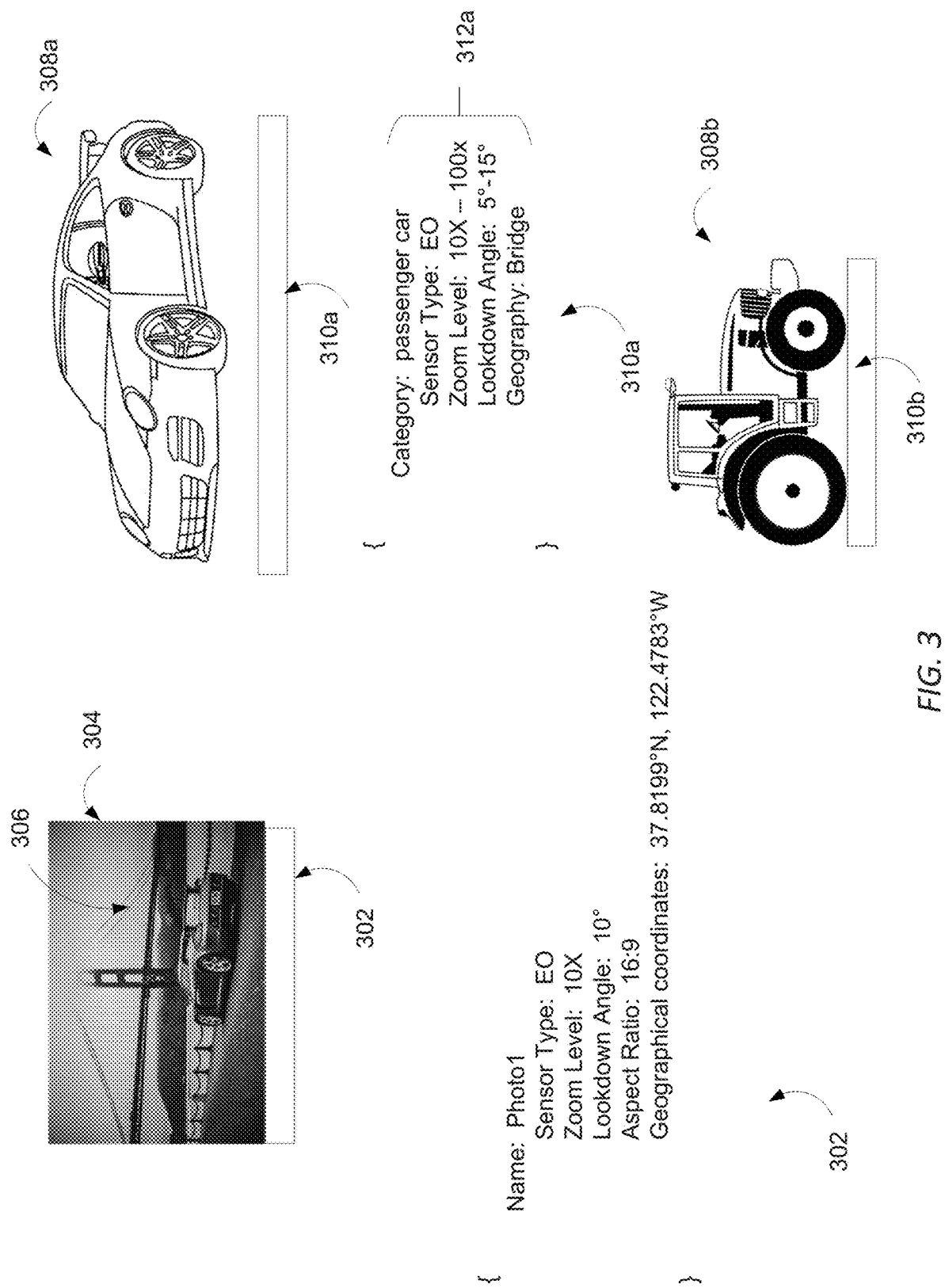

FIG. 3 is an illustration of an image with a matching classifier and a non-matching classifier.

Figure 4:
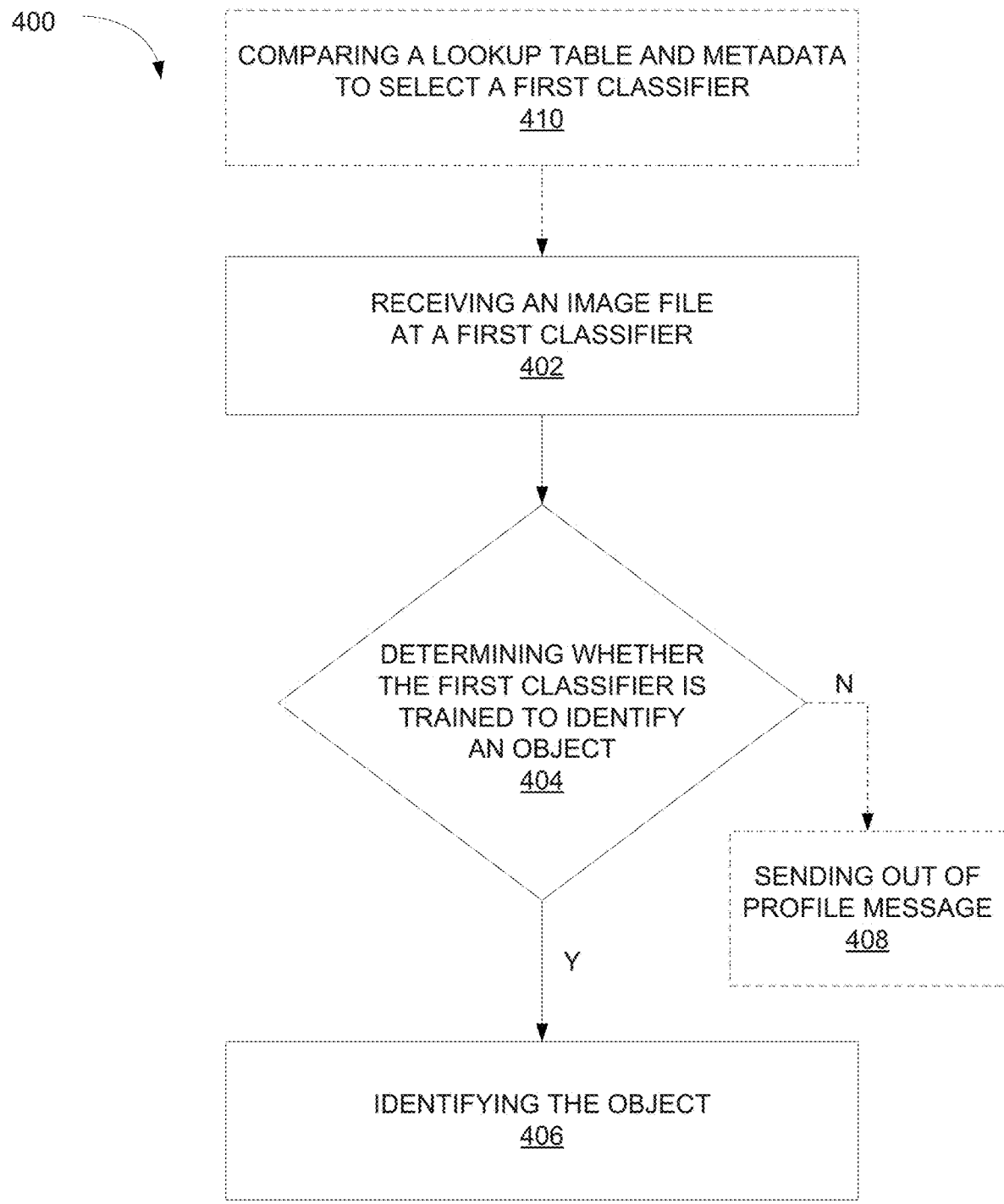

FIG. 4 is a flow chart of a method for identifying one or more objects in an image file.

Figure 5:
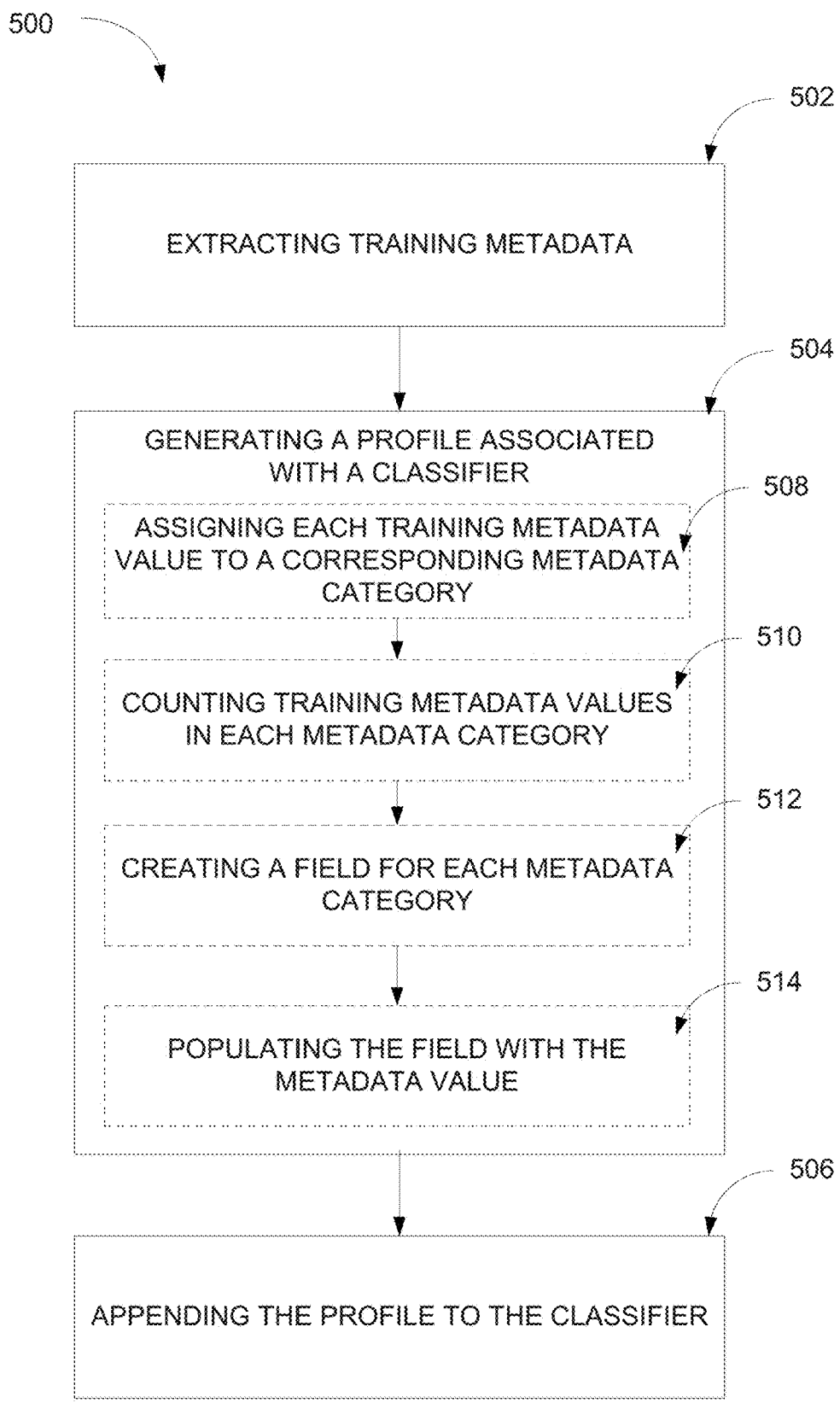

FIG. 5 is a flow chart of a method for training a set of automatic classifiers from training set metadata.

Figure 6:
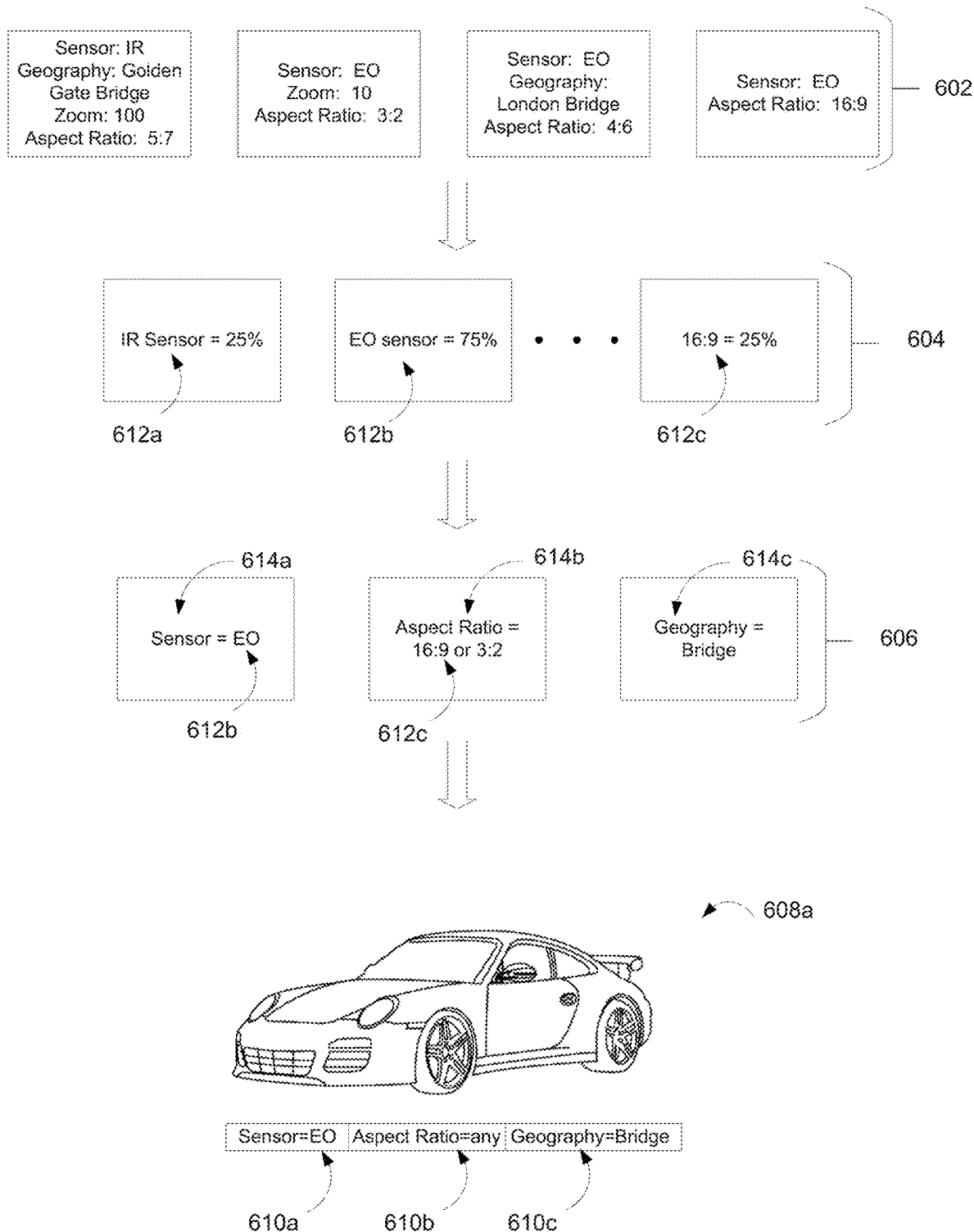

FIG. 6 is an illustration of building a classifier using training image files.

Figure 7:
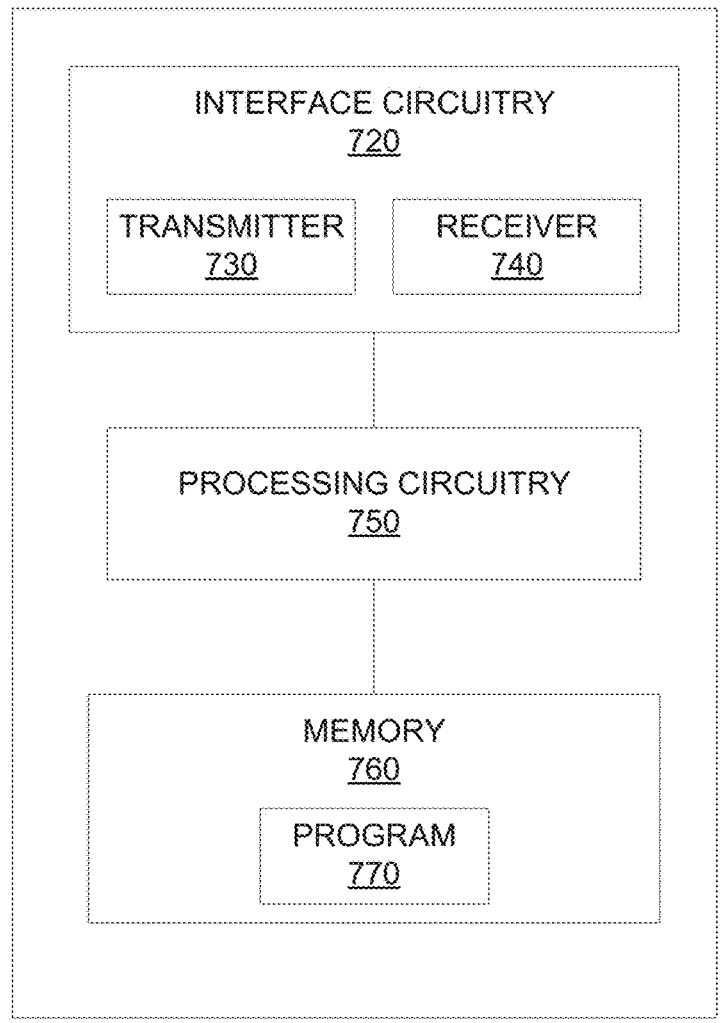

FIG. 7 is a block diagram of a system for training a set of automatic classifiers from training set metadata.

DETAILED DESCRIPTION

Embodiments herein append a profile based on the training set to the classifier so that a user can easily determine when to use a classifier. Being agnostic to a particular machine learning framework or library, embodiments can be used to augment classifiers trained using any process.

The performance of supervised classifiers can be dependent on the dataset used for training. If data is presented to the classifier that is significantly different from the training set, then the classifier may perform in a less than optimal manner. In order to avoid undesired outcomes, some embodiments can automatically capture the variation of the training data, such as metadata associated with training files, and build a profile for a classifier. This profile can be used to determine whether to process the input data by the classifier, providing a classifier with optimal performance. In some embodiments, the classifier can be combined with a profile to create a new self-aware classifier that can determine whether an image file is suitable and when to apply the classifier. Once the relevant metadata fields have been determined, the profile needs to be generated. This can be done by examining the distribution of each field.

FIG. 1 is an illustration of a system 100 for using a classifier to identify an object in an image 102. In system 100, an image 102 is captured using a camera 104. The image 102 is uploaded to a server 106. The image 102 can be an image for classification using a pre-existing classifier. The image can have a variety of metadata associated with it that can be extracted from the image 102. In some embodiments, the image metadata can identify characteristics of the image. For example, the metadata from the image 102 can include at least one of a sensor type, a zoom level, a lookdown angle, an aspect ratio, and geographical coordinates. As shown in image 102, the camera 104 has an electro-optical sensor where it took a photograph of a passenger vehicle near the Golden Gate Bridge.

The server 106 can determine whether a pre-existing classifier is trained to identify at least one object in the image 102 based on a set of training metadata associated with the pre-existing classifier. In some embodiments, the training metadata can define a set of characteristics for which the pre-existing classifier is trained to identify the object. If the server 106 determines that the pre-existing classifier is trained to identify the object in the image 102, the server 106 identifies an object in the image 102 using a classifier, the server 106 can provide results to a laptop 108. In some embodiments, if the pre-existing classifier is not trained to identify the object in the image 102, the server 106 can send a "no object identified" error to the laptop 108.

In some embodiments, the server 106 can use the image 102 as part of a training set of images. The server 106 can train the pre-existing classifier. For example, the server 106 can extract training metadata from the image, where the training metadata has training metadata values. The server 106 can then generate a profile for the pre-existing classifier, where the profile includes the training metadata. The server can append the profile to the pre-existing classifier.

In some embodiments, generating a profile for the pre-existing classifier can include assigning each of the training metadata values to a corresponding metadata category. Some embodiments for generating a profile can include counting a number of training metadata values in each metadata category. In some embodiments for generating a profile, for each metadata category having a training metadata value count that reaches a threshold, the method can create a field for the metadata category in the profile and populate the field with the training metadata values in the metadata category. In some embodiments, at least one field can be populated with a plurality of values.

In some embodiments, the server 106 and the laptop 108 can be the same device. In some embodiments, the camera 104 can be part of another device, such as the laptop 108.

FIG. 2 is an illustration of a set of images 204a-d with corresponding metadata 206a-d. In some embodiments, each image 204a-d would have a corresponding classifier (not shown) to classify each image 204a-d based on its corresponding metadata 206a-d. In FIG. 2, image 204a has metadata 206a with metadata characteristics 202a that include a name, sensor type, zoom level, lookdown angle, aspect ratio, and geographical coordinates. In some embodiments, a classifier can be trained to have a profile values similar to those in the image 204a can allow for classification of the object 208a in the image 204a, which is shown as a car. As described more in FIG. 6, the classifier is trained based on metadata from a set of training images.

FIG. 3 is an illustration 300 of an image 304 with a matching classifier 308a and a non-matching classifier 308b. As shown in FIG. 2, the image 304 can have an object 306 and image metadata 302. The image metadata 302 can include characteristics of the image 304, such as name, sensor type, zoom level, lookdown angle, aspect ratio, and geographical coordinates. A first classifier 308a can have a profile based on a first set of training metadata 312a associated with the first classifier 308a. Similarly, a second classifier 308b can have a profile with training metadata. Here, the profile of the first classifier 308a has a range of values that matches the characteristics of the image 304. Therefore, in at least some embodiments, the first classifier 308a can be used to identify the object 306 in the image 304 as being a passenger car.

FIG. 4 is a flow chart outlining non-limiting methods according to present aspects and including a method 400 for identifying one or more objects in an image file. The method allows for automatic classification from training set metadata. FIG. 3 will be used as an exemplary setting of the method 400. The method 400 includes receiving 402 an image file 304 at a first classifier 308a, wherein the image file 304 includes image metadata 302 that identifies characteristics of the image file 304.

The method 400 further includes determining 404 whether the first classifier 308a is trained to identify at least one object in the image file based on a first set of training metadata 310a associated with the first classifier 308a, wherein the first set of training metadata defines a set of characteristics for which the first classifier is trained to identify the at least one object. In some embodiments, the determining whether the first classifier 308a is trained to identify the at least one object in the image file further includes comparing the image metadata 302 to a first set of training metadata 310a. In some embodiments, the first set of training metadata 310a is different than the second set of training metadata 310b. In some embodiments, one or more parameter values in the first set of training metadata 312a are in a second set of training metadata 310b associated with a second classifier 308b. In some embodiments, the first set of training metadata 310a is associated with at least one of an aspect ratio, a sensor type, a zoom level, a viewing angle, and a geographical location.

When determining 404 first classifier is trained to identify an object, method 400 further includes identifying 406 the one or more objects in the image file 304 using the first classifier responsive to determining that the first classifier is trained to identify the at least one object. However, when determining 404 first classifier is not trained to identify an object, method 400 further includes sending 408 a no identification message. A user can be made aware that there is no identification of the object through at least one of a warning sound, a pop-up window, and other methods.

As shown in FIG. 4, optional steps can be included in some embodiments of the method 400. In some embodiments, the method 400 further includes comparing 410 the image metadata 302 with a lookup table to select the first classifier 308a. In some embodiments, the method 400 can include clustering the first classifier 308a and the second classifier 308b into a group of classifiers, wherein the first classifier 308a and the second classifier 308b are trained to identify objects belonging to an object category.

FIG. 5 is a flow chart outlining non-limiting methods according to present aspects and including a method 500 for training a set of automatic classifiers from training set metadata prior to their use in the method described in FIG. 4. FIG. 6, explained in more detail below, will be used as an exemplary setting of the method 500. The method 500 includes extracting 502 the training metadata 604 from a set of training image files 602, wherein the training metadata comprises training metadata values.

The method 500 further includes generating 504 a profile 606 for a first classifier (308a), including the training metadata. In some embodiments, generating the profile 606 includes assigning 508 each training metadata value to a corresponding metadata category 612a-c. Some embodiments can also include counting 510 a number of training metadata values 612a-c in each metadata category 614a-c. In some embodiments, the method can include for each metadata category 614a-c having a training metadata value count that reaches a threshold: creating 512 a field 610a-c for the metadata category 614a-c in the profile 606; and populating the field 606a-c with the training metadata values in the metadata category 614a-c. In some embodiments, the method can include populating 514 at least one field 606a-c that is populated with a plurality of values. For example, field 610b in FIG. 6 shows that multiple aspect ratios are input because "any" aspect ratio will meet the method's 400 requirement.

In some embodiments, the method 500 can include appending 506 the profile 606 to the first classifier 308a.

FIG. 6 is an illustration 600 of building a classifier 608a using training image files 602 and the accompanying training metadata 604. Image files 602 shown in FIG. 6 are represented with their metadata. In some embodiments, the classifier 608a can be trained by extracting the training metadata 604 from the training image files 602. As shown, the training metadata 604 can be separated so that each metadata category is represented as the percentage of training images files 602 with that particular metadata category. In FIG. 6, three out of four of the training image files 602 have the metadata of "EO". For example, EO sensor value 612b is 75%. Therefore, in this example, it is likely that an image of a passenger car will have metadata indicating it was obtained with an EO sensor.

To generate a profile 606 for the classifier 608a, one of the fields 610a will indicate that the sensor type is an EO sensor. In some embodiments, if more than one value is provided, e.g., values 612c, the plurality of values 612c can be included in the field 610b for that category 614b. For example, a zoom range of 10× to 1000× can be in the profile 606. Similarly, a non-contiguous set of values can be included, such as aspect ratios 16:9 and 3:2 as shown in FIG. 6.

More specifically to an embodiment for training, each training metadata value 612a-c can be assigned to a corresponding metadata category 614a-c. A number of training metadata values 612a-c in each metadata category 614a-c can be counted. Then, for each metadata category 614a-c having a training metadata value count that has reached a threshold, a field 606a-c can be created for the metadata category 614a-c in the profile 606, and the field 610a-c can be populated with the training metadata values 612a-c in the metadata category 614a-c.

In some embodiments, metadata can be embedded manually to each training sample. In some embodiments, existing embedded metadata can be used. For example, in images, EXIF, GeoTIFF, and MISB 0601 all embed metadata in image files.

FIG. 7 illustrates an apparatus 700 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The electronic device can be the server 106 of FIG. 1, such as a singular device on the vehicle or two separate devices, such as an onboard computing device and a diagnostic computing device. The apparatus may include one or more of each of a number of components such as, for example, processing circuitry 750 (e.g., processor unit) connected to a memory 760 (e.g., storage device).

The processing circuitry 750 may be composed of one or more processors alone or in combination with one or more memories. The processing circuitry is generally any piece of computer hardware that is capable of processing information such as, for example, data, computer programs or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 760 (of the same or another apparatus).

The processing circuitry 750 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 760 is generally any piece of computer hardware that is capable of storing information such as, for example, data, computer programs (e.g., computer-readable program code 770) or other suitable information either on a temporary basis or a permanent basis. The memory may include volatile and non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 760, the processing circuitry 750 may also be connected to one or more interfaces for displaying, transmitting and receiving information. The interfaces may include interface circuitry (e.g. a communications interface) 720. The interface circuitry 720 may be configured to transmit and receive information, such as to and from other apparatus(es), network(s) or the like. The communications interface may be configured to transmit and receive information by physical (wired) and wireless communications links. Examples of suitable communication interfaces include a network interface controller (NIC), wireless NIC (WNIC) or the like. The communications interface may have one or more transmitters 730. The communications interface may have one or more receivers 740.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and execution may be performed in parallel such that multiple instructions are retrieved, loaded, and executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 700 may include a processing circuitry 750 and a computer-readable storage medium or memory 760 coupled to the processing circuitry, where the processing circuitry is configured to execute computer-readable program code 770 stored in the memory. It will also be understood that one or more functions, and combinations of functions, may be implemented by special purpose hardware-based computer systems or processing circuitry s which perform the specified functions, or combinations of special purpose hardware and program code instructions.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of identifying one or more objects in an image file, the method comprising:
    extracting training metadata from a first set of training image files, wherein the training metadata comprises training metadata values;
    generating a profile for a first classifier, including the training metadata, with the profile defining characteristics for which the first classifier is trained to identify;
    appending the profile to the first classifier;
    receiving an image file at the first classifier, wherein the image file comprises image metadata that identifies characteristics of the image file;
    determining whether the first classifier is trained to identify at least one object in the image file based on the profile; and
    identifying the one or more objects in the image file using the first classifier responsive to determining that the first classifier is trained to identify the at least one object.

2. The method of claim 1, further comprising comparing the image metadata with a lookup table to select the first classifier.

3. The method of claim 1, wherein the determining whether the first classifier is trained to identify the at least one object in the image file further comprises comparing the image metadata to a first set of training metadata.

4. The method of claim 1, wherein the first set of training metadata is different than a second set of training metadata associated with a second classifier.

5. The method of claim 4, wherein one or more parameter values in the first set of training metadata are in a second set of training metadata associated with a second classifier.

6. The method of claim 1, further comprising clustering the first classifier and a second classifier into a group of classifiers, wherein the first classifier and the second classifier are trained to identify objects belonging to an object category.

7. The method of claim 1, wherein generating the profile comprises:
    assigning each training metadata value to a corresponding metadata category;
    counting a number of training metadata values in each metadata category; and
    for each metadata category having a training metadata value count that reaches a threshold:
        creating a field for the metadata category in the profile; and
        populating the field with the training metadata values in the metadata category.

8. The method of claim 7, wherein at least one field is populated with a plurality of values.

9. The method of claim 1, wherein the first set of training metadata is associated with at least one of an aspect ratio, a sensor type, a zoom level, a viewing angle, and a geographical location.

10. A system for identifying one or more objects in an image file, the system comprising:
    a memory; and
    processing circuitry coupled with the memory, wherein the processing circuitry is operable to:
        train a first classifier comprising:
            extract training metadata from a first set of training image files, wherein the training metadata comprises training metadata values;
            generate a profile for the first classifier, including the training metadata, with the profile defining characteristics for which the first classifier is trained to identify;
            append the profile to the first classifier;
        after the first classifier is trained, receive an image file at the first classifier, wherein the image file comprises image metadata that identifies characteristics of the image file;
        determine whether the first classifier is trained to identify at least one object in the image file based on the profile; and
        identify the one or more objects in the image file using the first classifier responsive to determining that the first classifier is trained to identify the at least one object.

11. The system of claim 10, wherein the processing circuitry is further operable to compare the image metadata with a lookup table to select the first classifier.

12. The system of claim 10, wherein the first set of training metadata is different than a second set of training metadata associated with a second classifier.

13. The system of claim 12, wherein one or more parameter values in the first set of training metadata are in a second set of training metadata associated with a second classifier.

14. The system of claim 10, wherein the processing circuitry is further operable to cluster the first classifier and a second classifier into a group of classifiers, wherein the first classifier and the second classifier are trained to identify objects belonging to an object category.

15. The system of claim 10, wherein generating the profile comprises:
    assigning each training metadata value to a corresponding metadata category;
    counting a number of training metadata values in each metadata category; and
    for each metadata category having a training metadata value count that reaches a threshold:
        creating a field for the metadata category in the profile; and
        populating the field with the training metadata values in the metadata category.

16. The system of claim 15, wherein at least one field is populated with a plurality of values.

17. A non-transitory computer-readable storage medium for identifying one or more objects in an image file, the computer-readable storage medium being non-transitory and having computer-readable program code portions stored therein that in response to execution by processing circuitry, cause an apparatus to at least:

train a first classifier comprising:
   extract training metadata from a first set of training image files;
   generate a profile for the first classifier, including the training metadata, with the profile defining characteristics for which the first classifier is trained to identify;
   append the profile to the first classifier;
after the first classifier is trained, receive an image file at the first classifier, wherein the image file comprises image metadata that identifies characteristics of the image file;
determine whether the first classifier is trained to identify at least one object in the image file based on the profile; and
identify the one or more objects in the image file using the first classifier responsive to determining that the first classifier is trained to identify the at least one object.

18. The system of claim 10, wherein the first set of training metadata is associated with a technical aspect regarding how the image was captured in a digital format.

19. The system of claim 10, wherein the first set of training metadata is associated with a geographical location.

20. The system of claim 1, wherein the first set of training metadata is associated with a technical aspect regarding how the image was captured in a digital format.

* * * * *